Figure 1:
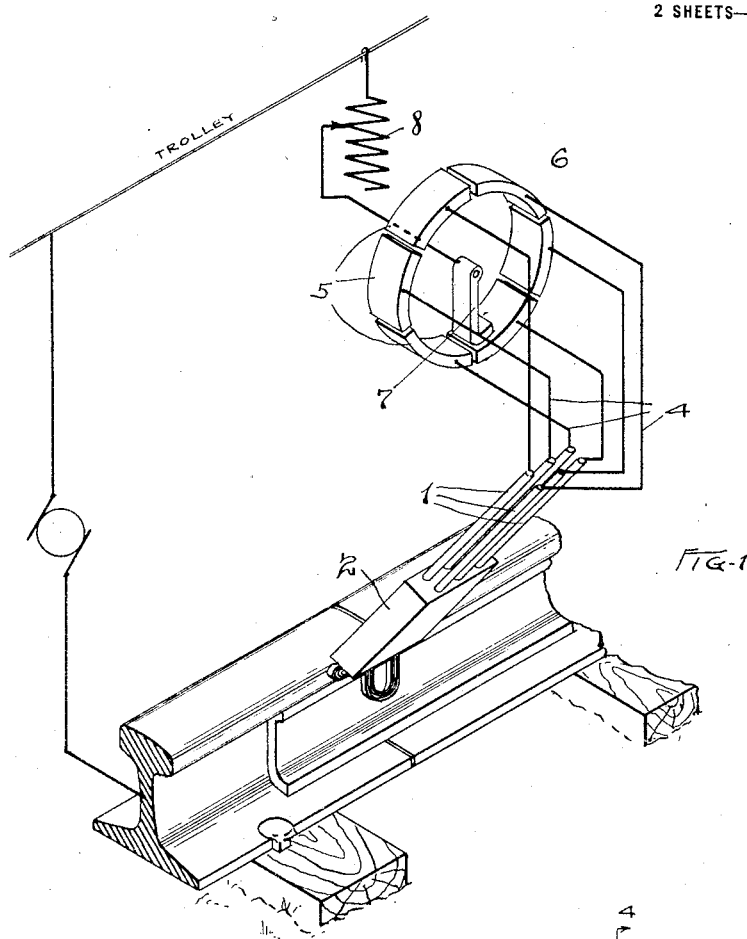

A. B. HERRICK.
METHOD OF MAKING A HOMOGENEOUS MECHANICAL JUNCTURE.
APPLICATION FILED NOV. 29, 1912.

1,142,428. Patented June 8, 1915.
2 SHEETS—SHEET 1.

WITNESSES:
Oliver M. Kappler.
Anna L. Gill.

INVENTOR
Albert B. Herrick
BY Fay and Oberlin
ATTORNEYS.

A. B. HERRICK.
METHOD OF MAKING A HOMOGENEOUS MECHANICAL JUNCTURE.
APPLICATION FILED NOV. 29, 1912.

1,142,428.

Patented June 8, 1915.
2 SHEETS—SHEET 2.

WITNESSES:
Oliver M. Kappler
Anna L. Gill

INVENTOR
Albert B. Herrick
BY Fay and Oberlin
ATTORNEYS

UNITED STATES PATENT OFFICE.

ALBERT B. HERRICK, OF NEW YORK, N. Y., ASSIGNOR TO THE ELECTRIC RAILWAY IMPROVEMENT COMPANY, OF CLEVELAND, OHIO, A CORPORATION OF OHIO.

METHOD OF MAKING A HOMOGENEOUS MECHANICAL JUNCTURE.

1,142,428.    Specification of Letters Patent.    Patented June 8, 1915.

Application filed November 29, 1912. Serial No. 733,975.

*To all whom it may concern:*

Be it known that I, ALBERT B. HERRICK, a citizen of the United States, and a resident of New York, county of New York, and State of New York, have invented a new and useful Improvement in Methods of Making a Homogeneous Mechanical Juncture, of which the following is a specification, the principle of the invention being herein explained and the best mode in which I have contemplated applying that principle, so as to distinguish it from other inventions.

The present process may be regarded as an improvement in the method of making homogeneous mechanical junctures described in U. S. Letters Patent No. 1,012,077, issued to me December 19, 1911, such process having as its object the welding together of metal bodies having unlike characteristics as to fusibility, such for example as copper bonds to steel rails in the operation of "bonding" rails, as is necessary in electrical railways in order to adapt said rails for use as a conductor for the return circuit. The present improved process has more particular regard to a method of and apparatus for utilizing a direct current of relatively high voltage (500 or 600 volts), which is ordinarily used in the operation of electric railways, in developing the external source of heat which is utilized in my aforesaid patented process. In such patented process, a solid electrode of carbon or equivalent material is designed to be pressed against the bond terminal or equivalent article of relatively lower fusibility and greater heat conductivity, and a heating electric current then passed through said electrode until a high temperature is produced therein, the contacting face of the larger body (having the higher fusibility and lower heat conductivity) being heated by conduction through the smaller body, whereby the smaller body and the contacting face of the larger body are brought to a welding temperature practically simultaneously. A current of low voltage and large amperage is required to heat an electrode of the necessary size and area for use in such process and a current such as described above as being ordinarily available has accordingly to be converted and stepped down in order to render it available for use in the bonding operation. The use of the direct current at relatively high voltage has hitherto been found impracticable where a weld or union possessing good electrical conductivity is the result desired; for owing to the arcing effect and the very high temperature incidentally produced, such current instead of simply fusing the contacting faces of the bodies to be united will more or less vaporize and dissipate the materials of said bodies, and particularly a body of fusible material, such as a bond which is usually composed of copper, and leave the products of such arcing in the juncture produced.

The use of direct current at high voltage produces an arc volatilizing and boiling the conductors in its path. This arcing path is so restricted that no areas of any considerable extent can be heated thereby; and, furthermore, after the current once establishes an arcing path, the vapors and molten material offer much less electrical resistance than does the surrounding medium, thus additionally restricting the heating effect to be derived from a current of this kind, and rendering the use of a continuous high-tension current by any method at present in commercial use unsuitable for the heating of a surface, as is necessary in the application in hand. Again, in order to keep the volume of current flowing across an arc within controllable limits, the arc must have a certain minimum length, and such an arc is easily deflected by surrounding influences from the point or points where the application of its heating effect is desired. Moreover, the use of a high-tension, arcing electrode not only volatilizes the material of the electrode but also the metals being joined, producing oxides or other deposits which become incorporated in the weld and render a homogeneous juncture of such metals, even in the relatively restricted areas that are joined together, a practical impossibility.

It has been found that when a current of high voltage has been applied to a high resistance contact, that the electrodes in contact must first be heated to the point of vaporization to form a molten carrier for the arc; also that there is a time element necessary to be allowed, for a point, or restricted area of high temperature, to effect the rise of temperature of the surrounding media; also that a short application of high voltage and current conditions to a contact-point will produce substantially the same resulting heating effect as a lower energy value continuously applied with the additional advantage that the interrupted current has not time to raise the volatilizable material in the electrodes to a condition suitable for the production of an arcing path. Hence, as the desired temperature of the welding electrode is way below the volatilizing temperature, I utilize an electrode made up of a plurality of contact surfaces, or arcing points to which the high voltage current is successively, momentarily supplied, the effect being that this momentary application at frequent intervals causes the energy to spread to adjacent surfaces, forming a high temperature area which can be utilized in welding processes of the kind in hand, without destruction of the physical characteristics of the metals welded. As the application of energy is only for a short interval this current can be used at a number of adjacent heating points and so commutated as to form a cycle of intermittent applications of high temperature impulses, all acting on the heating surface and so adaptable for welding together homogeneously two metal surfaces.

There are a number of ways wherein this invention can take practical form, the general operation involved being a commutation of current to various electrodes and this current can be taken from the trolley in the case where the process is one of bonding, and can be controlled in its intensity by a rheostat or, utilizing the intermittent character of the current, I can make its volume controllable by the employment of an induction device, either one induction device common to all the circuits to the various electrodes, or preferably, an induction device included on each electrode circuit. In this way regulation of the ultimate temperature to be obtained can be effected by the speed given the contact-arm distributing this current to the various electrodes, keeping in mind that the approximately effective voltage applied to any one electrode is determined by the ratio of the time of contact to the total time elapsed between contacts, as the source of electromotive force is to the E. M. F. applied to each electrode.

With the object in view of utilizing a current of the character described, in such an operation as bonding and elsewhere where it is desired to secure a junction having good electrical conductivity, as distinguished from an ordinary mechanical joint, the present improved steps and means have been devised, all as will be hereinafter fully described and particularly pointed out in the claims.

The annexed drawings and the following description set forth in detail certain steps and mechanism embodying the invention, such disclosed means constituting, however, but several of the various mechanical ways in which the principle of the invention may be used.

Figure 2:
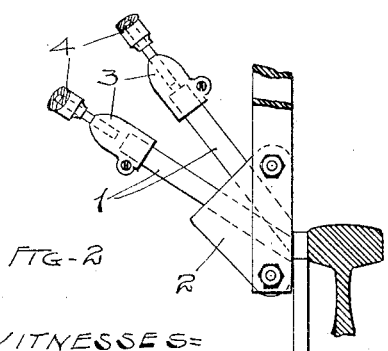
Figure 3:
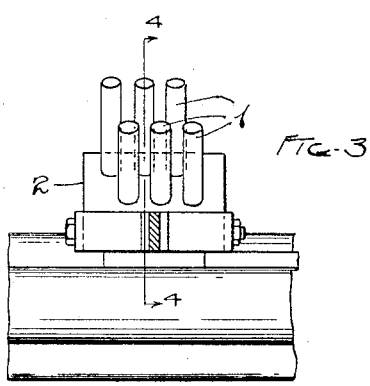
Figure 4:
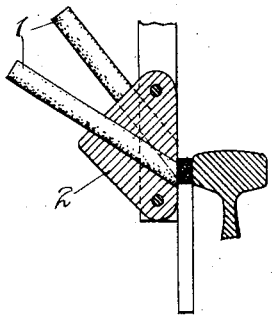
Figure 5:
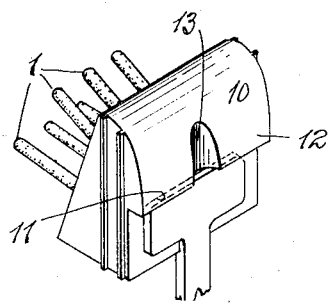

In said annexed drawings, Figure 1 is a perspective view, in the nature of a diagram, of a simple form of apparatus adapted for the carrying out of my improved process; Figs. 2, 3 and 4 illustrate in side elevation, plan view and cross-section, respectively, an electrode which forms a part of said apparatus; Fig. 5 is a perspective view and Fig. 6 a section of a modified construction of electrode; while Figs. 7 and 8 respectively illustrate diagrammatically, two more elaborate apparatuses suitable for the carrying on of my improved process, but utilizing an electrode of the same construction as those shown in the preceding figures.

In carrying out the present process, I make use of an electrode consisting of a plurality of insulated elements, as for example carbon rods, the inner ends of which are approximately disposed in the same plane and adapted to contact either with the article to be heated or with an interposed plate of carbon or equivalent material, which in turn contacts with such article, as for example, the bond terminal in the case of the specific application of the process under consideration. A current commutating device, of which several forms are shown, is then utilized to supply the current in succession to the individual carbons of the electrode, the current being derived from the trolley or similar source and merely passing through a regulating resistance on its way to the device. If desired, an inductive resistance may be utilized instead of the simple regulating resistance, and in place of a single such resistance, a plurality, corresponding with the number of separate elements in the electrode, may be employed.

By the foregoing device, the current is caused to flow through the separate elements of the electrode in succession, the return being through the rail and usual ground return circuit. The connections with the individual carbons of the electrode are made and broken with sufficient rapidity to avoid the formation of the harmful arc between the same and the article being heated, while the successive impulses of current will nevertheless be sufficient to raise such carbons, or electrode elements, at their points of contact with the article to a proper temperature to effect the desired welding operation.

The construction of the electrode may be very readily explained by reference to Figs. 2, 3 and 4, in which said electrode is illustrated as comprising six separate rods 1 held in a block 2 of vitrified fire clay, the carbons preferably projecting without said block to the rear and lying substantially flush with its inner face, that is, the face which is designed to be brought against the bond terminal. A plate of carbon may be interposed between such inner ends of the carbon rods or not, as desired, this arrangement being shown in the modified construction of Figs. 5 and 6.

By means of suitable clamps 3, electric conductors or leads 4 are attached to the respective outer ends of the carbon rods 1, the other end of each such lead being connected with the corresponding segment 5 of a distributing commutator 6, in the case of the simple apparatus shown in Fig. 1. A rotatable brush 7 is arranged to contact with these commutator segments in succession, said brush being in direct electrical connection with the trolley, save for a regulating resistance 8, that is interposed for the purpose already explained. It has already been explained that an inductive resistance may be substituted for such regulating resistance, if desired. The rotation of the commutator brush 7 may be produced in any suitable fashion, a motor (not shown) being conveniently provided for the purpose, operable by the trolley current. The rate of rotation will be varied to suit the character of the current and the number of separate contacts or electrode elements.

Figure 6:
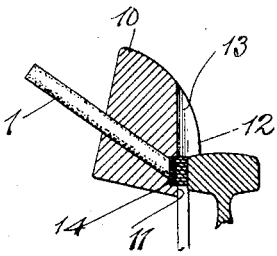

The modified construction of electrode 10, illustrated in Figs. 5 and 6, is characterized by slightly differently shaped holder in which are mounted plurality of electrically separated carbon rods 1 as before. The face of the holder designed to press the bond against the rail is provided with a recess 11 of approximately the same shape as the bond terminal, but a trifle shallower so that the latter's inner face will project beyond the face of the holder a corresponding amount. Such bond-contacting face of the holder is furthermore provided with an overhanging portion 12 which is adapted to rest on the top of the rail and thus assist in locating the holder in proper relation to such rail. This overhanging portion is provided with an opening 13 that communicates with the recess 11, so that additional material may be supplied and melted in such recess after the bond terminal has come to the melting point, if such additional material be necessary; or any excess of material formed by the fusion of the terminal, may escape by way of said opening 13, as through a sprue opening. In this construction of electrode, moreover, the lower ends of the separate carbon rods do not rest directly on the inner face of the holder, but a plate 14 of carbon, or other suitable high-resistance material, forms the back of the aforesaid recess 11 that is provided in the holder face for the reception of the bond material and the end of the carbon rods bear against the rear face of this plate. The forward face of the plate, of course, will contact directly with the bond terminal and communicate thereto the heat generated by the successive application of momentary electrical impulses to the different rods. Such plate serves, in effect, as a distributer, merely, of the heat thus generated, as will be readily understood.

Figure 7:
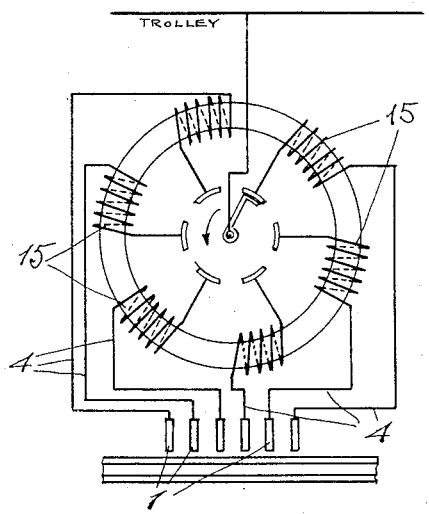

Fig. 7, it has already been explained, illustrates a modification in the general arrangement of apparatus, such apparatus being wholly diagrammatically shown in this figure. Instead of a simple regulating resistance 8 interposed between the distributing commutator and the trolley wire, or other source of current supply, an inductive resistance 15 is interposed in each of the leads 4 from said commutator to the several separate carbon rods of the electrode. It has been explained that an inductive resistance, even if merely one be substituted for the single regulating resistance shown in Fig. 1, possesses certain advantages over the latter, in that it prevents surges of current through the conductors 4, as the connection with the latter is rapidly made and broken. This advantage is still further realized where separate inductive resistances are interposed in each of the conductors or leads, as shown in this Fig. 7.

Figure 8:
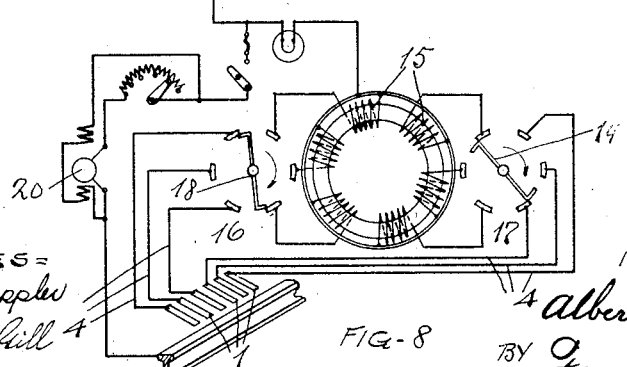

The apparatus shown in Fig. 8, likewise utilizes this feature of individual inductive resistance for the separate leads or conductors from the commutator to the individual components of the electrode. Two commutators 16 and 17, however, are employed in this form of apparatus, both adapted to make and break the connection for half of the total number of electrode elements, viz. for three in the construction illustrated, where there are six such elements altogether. The corresponding rotating commutator members 18 and 19, which effect such making and breaking of the circuits, are mounted so as to rotate in unison but with the one 19 a trifle to the rear of the other 18, and so spaced that the connection for the second electrode element is made before the connection of the first is entirely broken, thus causing the impulses of current to said electrode element to overlap. The two rotary members or contactors of the commutator will be preferably carried on the armature shaft of the motor 20, which is illustrated in this figure, with proper connections 21 from the main circuit for operating the same.

Other modes of applying the principle of my invention may be employed instead of the one explained, change being made as regards the steps herein disclosed, provided the steps stated by any of the following claims or the equivalent of such stated steps be employed.

I therefore particularly point out and distinctly claim as my invention:—

1. The method of homogeneously uniting metal bodies, which consists in holding said bodies in contact at the desired point of union; and directly heating one of said bodies by pressing against the same an electrode composed of a plurality of electrically separated resistance elements, and thereupon passing an electric current in rapid succession through said resistance elements and bodies, whereby said first body and the contacting face of the second body are brought to a welding temperature.

2. The method of homogeneously uniting metal bodies having unlike characteristics as to fusibility, the more readily fusible body having also the greater heat conductivity, which consists in holding said bodies in contact at the desired point of union; and directly heating the first or more readily fusible body by pressing against the same an electrode composed of a plurality of electrically separated resistance elements, and thereupon passing an electric current in rapid succession through said resistance elements and bodies, whereby said first body and the contacting face of the second body are brought to a welding temperature.

3. The method of homogeneously uniting metal bodies of unlike masses and different temperatures of fusion, the smaller body having both the lower temperature of fusion and greater heat conductivity, which consists in holding said bodies in contact at the desired point of union; and directly heating one of said bodies by pressing against the same an electrode composed of a plurality of electrically separated resistance elements, and thereupon passing an electric current in rapid succession through said resistance elements and bodies, whereby said first body and the contacting face of the second body are brought to a welding temperature.

4. The method of homogeneously uniting a bond to a rail, which consists in holding the bond in contact with the rail at the desired point of union; directly heating said bond by pressing against the same an electrode composed of a plurality of electrically separated resistance elements, and thereupon passing an electric current in rapid succession through said resistance elements, bond and rail, whereby said bond and the contacting face of the rail are brought to a welding temperature.

5. The method of electrically heating a body, which consists in holding in contact therewith a plurality of electrically separated resistance elements, and then passing an electric current through said resistance elements in rapid succession, such current being also passed through an inductive resistance, the period of current flow through any one element of said electrode being insufficient to produce any harmful arcing effect.

Signed by me, this 26th day of November, 1912.

ALBERT B. HERRICK.

Attested by—
D. T. Davies,
Jno. F. Oberlin.